June 16, 1964  JEAN-MARIE LEROLLE  3,137,542
METHOD OF MAKING NITRIC ACID
Filed Jan. 19, 1961
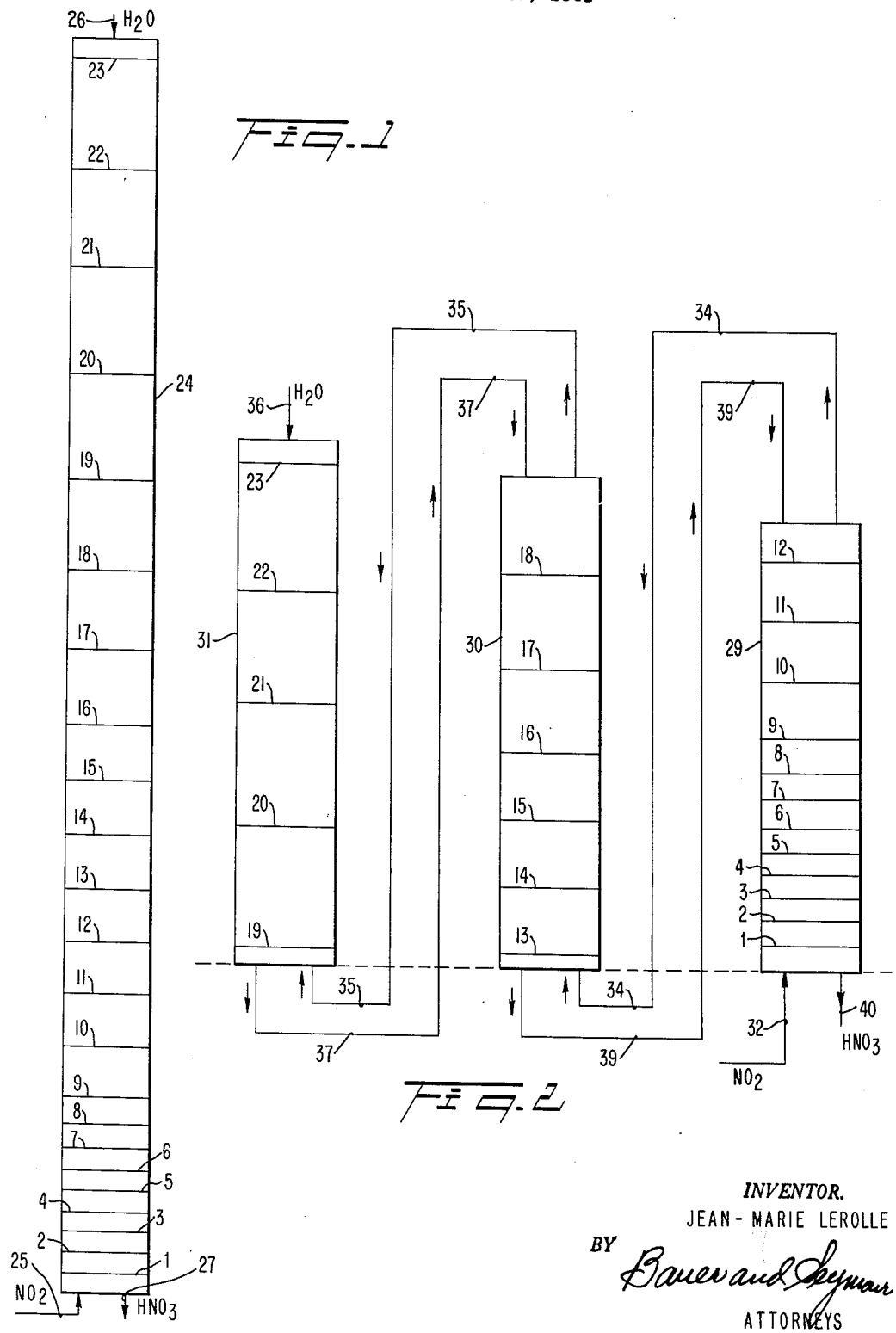
INVENTOR.
JEAN-MARIE LEROLLE
BY Bauer and Seymour
ATTORNEYS

… …

United States Patent Office 3,137,542
Patented June 16, 1964

---

3,137,542
METHOD OF MAKING NITRIC ACID
Jean-Marie Lerolle, Paris, France, assignor to Compagnie de St. Gobain, Neuilly-sur-Seine, France
Filed Jan. 19, 1961, Ser. No. 83,697
Claims priority, application France Jan. 20, 1960
2 Claims. (Cl. 23—157)

This invention relates to an apparatus for and a method of making nitric acid. More particularly, the invention relates to the making of nitric acid by contacting oxides of nitrogen with water and absorbing $NO_2$ in the resulting liquid to form nitric acid.

One of the known methods of forming nitric acid involves the burning of ammonia to form $NO_2$, and passing the $NO_2$ into the bottom of a column provided with plates, water being introduced into the top of the column so that gas and liquid contact each other in counter-current. When $NO_2$ is absorbed in water, the following reaction occurs:

$$3NO_2 + H_2O \rightarrow 2HNO_3 + NO$$

Thus for each three molecules of $NO_2$ involved in the reaction one molecule of $NO$ is liberated. The $NO$ is oxidized to $NO_2$ so that the absorption reaction continues and that the gas introduced into the column is substantially stripped of oxides of nitrogen before it leaves the column.

It is known that the oxidation of $NO$ in the column, and also absorption of $NO_2$ by water, operate more efficiently the lower the temperature of the reaction. It is because of this that provision is made in the column for cooling as much as possible the liquid on the plates of the column. In the prior art in the columns employed for making nitric acid, the plates are disposed at equal distances from each other. In installations employing a plurality of columns, the columns are generally disposed in series so that the gas travels successively through them. Wates is introduced at the top of the last column and concentrated nitric acid, generally containing 56–57% of $HNO_3$, is discharged at the lower end of the first column, that is from the lower end of the column into which the gas is first introduced.

The volume of the column or columns is determined as a function of the composition of the gas introduced into the absorption-oxidation system. Other factors entering into the determination of such volume of the column or columns are the pressure of the gas, the concentration of acid desired, the relative contents of the oxide of nitrogen and of oxygen in the gas introduced into the system, the degree of refrigeration of the liquid on the plates, and the type of the plates employed in the column or columns.

The invention has among its objects the provision of an improved apparatus of the type indicated for the production of nitric acid.

A further object of the invention lies in the provision of an improved absorption-oxidation method for the production of nitric acid.

In experimentation leading up to the present invention, it has been found that the disposition of the plates at equal distances from each other does not produce the best results in the operation of making nitric acid by the described method. With the prior method the concentration of the acid obtained and the degree of exhaustion of the oxide or oxides of nitrogen from the gas introduced into the column are not so high as could be desired. The method and apparatus of the present invention increases the concentration of the acid obtained and raises the degree of exhaustion of the oxides of nitrogen in the gas being treated. The invention also permits the total volume of the columns employed and/or the number of plates in the columns to be reduced. In accordance with the invention, the first plates of the column, that is, those which effect the exchange between gases rich in oxides of nitrogen and the liquid which is rich in nitric acid, are positioned relatively close together. At the same time, the spacing between the plates subsequently encountered by the gas is increased at zones where the gas has had some of the oxides of nitrogen removed therefrom and where the liquid is either dilute nitric acid or is pure water.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a somewhat schematic view of a first apparatus made in accordance with the invention, the apparatus employing only one column; and FIG. 2 is a somewhat schematic view of a second embodiment of apparatus in accordance with the invention, such apparatus employing a plurality of serially connected columns.

In FIG. 1 there is shown a vertically disposed column 24 having a series of vertically spaced plates numbered 1–23, inclusive, disposed therein. Such plates, which may be of conventional design, are provided with a plurality of small openings therethrough through which gas may flow upwardly. The plates are of such construction that a layer of liquid of appreciable depth lies upon the plates, the liquid being led from an upper plate to the next lower plate by overflow means, not shown. In the apparatus of FIG. 1 a gas rich in $NO_2$ is introduced into the lower end of the column through conduit means 25. Water is introduced into the top of the column through conduit means 26. Thus the oxides of nitrogen flow upwardly in a gas counter-current to the liquid flowing downwardly within the column. Nitric acid is removed from the lower end of the column through a delivery conduit 27.

In the apparatus of FIG. 2, three columns 29, 30, and 31 are connected in series, the spacing between the plates 1–23, inclusive, in the respective columns, approximating that in the lower portion, intermediate portion, and upper portion of column 24 of FIG. 1. The total length of columns 29, 30, and 31 approximates that of column 24, and the cross section of the space within the columns 29, 30, and 31 is substantially the same as that of column 24.

In the apparatus of FIG. 2 gases rich in oxides of nitrogen are introduced into the lower end of column 29 through a pipe 32. The gas rises upwardly within column 29 and passes into a conduit 34 by which it is led to the lower end of column 30. After passing upwardly through column 30 the gas is led by a conduit 35 into the lower end of column 31. The gas may be forced through pipes 34 and 35 by a suitable pumping means, not shown. Water is introduced into the upper end of column 31 through a pipe 36. The liquid is removed from the bottom end of column 31 through a pipe 37 by which it is introduced into the upper end of column 30. Liquid is removed from the bottom end of column 30 through a pipe 39 by which it is introduced into the upper end of column 29. Nitric acid is removed from the lower end of column 29 through a conduit 40.

As shown in both FIGS. 1 and 2, the spacing between successive pairs of plates in the column or columns increases in the direction of flow of gases through the column. Thus in FIG. 1 the space between successive pairs of plates in column 24 increases progressively from the bottom to the top of the column. In FIG. 2 the space between successive pairs of plates increases progressively from the bottom to the top of column 29, from the bottom to the top of column 30, and from the bottom to the top of column 31.

It has been found that the method and apparatus of the invention are particularly advantageous when the distance between the first pair of plates is substantially on the order of $$E = \frac{2V}{SN(N-1)}$$

wherein V is the total free volume within the column or columns, N is the total number of plates, and S is the area of cross section of the column or columns. The spacing between succeeding pairs of plates, in such preferred embodiment, is such that such spaces are equal to 2E, 3E, and so forth.

In columns having a large number of plates, it is inconvenient and not commercially feasible to use the spacing between the first plates determined by the above equation. This is because the equation gives a value for the distance between the first plates which is too small to permit practical construction of the apparatus. It is thus necessary as a matter of practice to increase the spacing between the first plates over that indicated by the above equation. In the case of the other plates as well, the spacings therebetween determined by the equation, if literally followed, would yield constructions which are not always practicable. This is by reason of standard dimensions imposed by the construction elements used. The spacings between plates are not critical, however, so that it is possible to depart from the indicated values, as, for example, on the order of 10%.

There is given hereafter, by way of example, the spacing between plates employed in an apparatus for making nitric acid in accordance with the present invention. In such apparatus three columns were employed, as indicated in FIG. 2. The three columns had a total free space therewithin of 820 cubic meters, an inner column diameter of 4.02 meters, so that $S = 13.85\pi'$. N, the total number of plates in the three columns, equals 23. By application of the formula $$E = \frac{2V}{SN(N-1)}$$

the distance E was found to equal 0.233 meter. The distances between successive pairs of plates were calculated to be:

| Space between plates— | Space in meters |
|---|---|
| 1—2 | 0.233 |
| 2—3 | 0.466 |
| 3—4 | 0.699 |
| 4—5 | 0.932 |
| 5—6 | 1.165 |
| 6—7 | 1.398 |
| 7—8 | 1.631 |
| 8—9 | 1.864 |
| 9—10 | 2.097 |
| 10—11 | 2.330 |
| 11—12 | 2.563 |
| 12—13 | 2.796 |
| 13—14 | 3.029 |
| 14—15 | 3.262 |
| 15—16 | 3.495 |
| 16—17 | 3.728 |
| 17—18 | 3.961 |
| 18—19 | 4.194 |
| 19—20 | 4.427 |
| 20—21 | 4.660 |
| 21—22 | 4.893 |
| 22—23 | 5.126 |
| | 58.949 |

Employment of the present invention results in considerably reducing the amount of non-absorbed oxide of nitrogen which is lost in the gas being processed. The content of oxide of nitrogen thus lost in the gas, given in percent by volume of NO, is in the neighborhood of 0.24% when the apparatus is made in accordance with the prior art. When, however, the apparatus set forth in column 2 of the above table is employed, the amount of $NO_2$ which is lost, calculated on the same basis, is only 0.12%. The increase in the degree of absorption of oxides of nitrogen is accompanied by an increase in the concentration of the nitric acid produced; the nitric acid produced by the apparatus and method of the present invention has a concentration of at least 56% by weight, and frequently equals 60% by weight.

The theoretical explanation of the above-listed favorable results might be the following: it is known that the formation of nitric acid occurs according to the following equation $$3NO_2 + H_2O \rightarrow 2NO_3H + NO$$

The so-formed NO is re-oxydated according to $$2NO + O_2 \rightarrow 2NO_2$$

This oxidation reaction conditions the volume of the absorption units. The amounts of NO formed and the amounts of available oxygen decrease while absorption proceeds. As a consequence, the speed of oxidation of NO also decreases.

It thus appears logical to have a progressive increase of the volumes where the oxidation reaction takes place. If the spaces near the tail of the column were of the same order as those near the head, a considerable evolution of heat would occur in an area where it is desirable to keep the temperatures of the gas and the acid at their lowest and important refrigeration means would then be required, involving considerable investments.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A method of making nitric acid by the absorption and oxidation of oxides of nitrogen which comprises admitting water to the top of a column and $NO_2$ to the bottom thereof, said column being provided with a plurality of spaced plates disposed so as temporarily to retain liquid thereon, and providing an increased space between successive pairs of plates in the upper gas discharging portion of the column as compared to the intermediate portion of the column, and in increased space between successive pairs of plates in the intermediate portion of the column as compared to the lower portion of the column, and discharging $HNO_3$ from the bottom of the column.

2. A method as defined in claim 1 wherein the distance between the first two plates at the bottom of the column is on the order of $$E = \frac{2V}{SN(N-1)}$$

and the distances between successive pairs of plates in an upward direction on the order of 2E, 3E, and so forth, E being the distance between pairs of plates, V being the total free space in the column, N being the total number of plates in the column, and S being the cross sectional area of the column.

References Cited in the file of this patent

UNITED STATES PATENTS 2,142,646  Handforth _____ Jan. 3, 1939
2,206,495  Beardsley _____ July 2, 1940